(12) United States Patent
Hecht (10) Patent No.: US 7,524,147 B2
(45) Date of Patent: Apr. 28, 2009

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 853 days.

(21) Appl. No.: 11/041,204

(22) Filed: Jan. 25, 2005

(65) Prior Publication Data

US 2005/0207854 A1 Sep. 22, 2005

(30) Foreign Application Priority Data

Mar. 18, 2004 (IL) .................................. 160935

(51) Int. Cl.
*B23B 27/04* (2006.01)
*B26D 1/03* (2006.01)

(52) U.S. Cl. ..................... 407/107; 407/110; 407/109

(58) Field of Classification Search ................. 407/107, 407/109, 110, 117, 66
See application file for complete search history.

(56) References Cited

U.S. PATENT DOCUMENTS

| | | | |
|---|---|---|---|
| 5,161,920 A * | 11/1992 | Zinner | 407/110 |
| 5,743,680 A * | 4/1998 | Von Haas et al. | 407/19 |
| 5,803,675 A * | 9/1998 | Von Haas | 407/107 |
| 6,176,649 B1 * | 1/2001 | Friedman | 407/110 |
| 6,234,727 B1 * | 5/2001 | Barazani | 407/117 |
| 6,579,044 B1 * | 6/2003 | Trenkwalder et al. | 407/110 |
| 6,702,527 B2 * | 3/2004 | Barazani | 407/42 |
| 7,073,986 B2 * | 7/2006 | Andras | 407/113 |
| 7,179,021 B2 * | 2/2007 | Shaheen | 407/107 |
| D550,730 S * | 9/2007 | Nicholas | D15/140 |
| 7,329,072 B2 * | 2/2008 | Nagaya et al. | 407/109 |

\* cited by examiner

*Primary Examiner*—Willmon Fridie
(74) *Attorney, Agent, or Firm*—Womble Carlyle (57) ABSTRACT

A cutting tool comprises an insert holder and a cutting insert. The insert holder has a clamping portion comprising a base jaw a clamping jaw and an insert pocket therebetween. The clamping jaw comprises two independently resilient elongated sub-clamping jaws separated by an elongated recess. The cutting insert is resiliently clamped in the insert pocket between the two elongated sub-clamping jaws and the base jaw.

29 Claims, 4 Drawing Sheets

CUTTING TOOL AND CUTTING INSERT THEREFOR

FIELD OF THE INVENTION

The present invention relates to cutting tools of the type in which a cutting insert is resiliently clamped in a self-retaining manner in an insert pocket.

BACKGROUND OF THE INVENTION

Examples of such cutting tools are grooving tools, in which the insert holder has the form of a generally rectangular blade, and rotary slot-cutting tools, in which the insert holder is disc shaped with the cutting inserts retained in insert pockets around the periphery of the disc. In both the grooving and the rotary slot-cutting cutting tools, the insert pocket is located in a clamping portion of the cutting tool and is defined between a clamping jaw and a base jaw. The clamping and base jaws are resiliently displaceable with respect to each other and are formed from an integral single piece.

Figure 8:
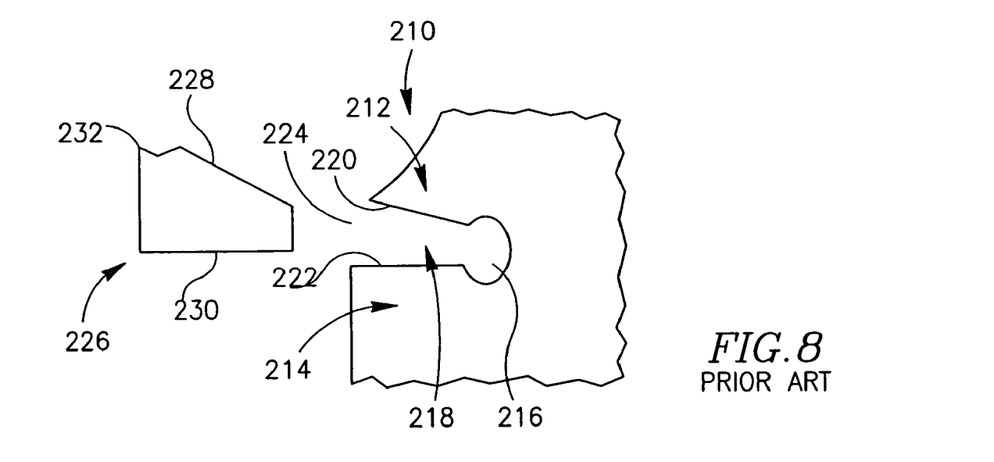
FIG. 8 is a partial side exploded view of a cutting portion of prior art cutting tool.
Figure 9:
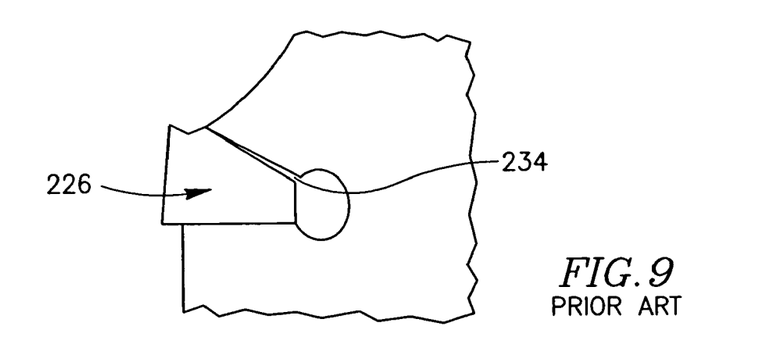
FIG. 9 is a partial side view of the cutting portion of the prior art cutting tool.

A cutting portion 210 of a typical prior art cutting tool is shown in FIGS. 8 and 9. The cutting portion 210 comprises an upper clamping jaw 212 connected to a lower base jaw 214 via a rounded aperture 216 with an insert pocket 218 defined between the clamping and base jaws 212, 214. The clamping and base jaws 212, 214 have clamping surfaces 220, 222 which converge rearwardly from an opening 224 located at a forward end of the insert pocket 218. The cutting insert 226 comprises upper and lower abutment surfaces 228, 230 and a cutting edge 232 at a forward end of the cutting insert 226. The upper and lower abutment surfaces 228, 230 converge rearwardly from the forward end of the cutting insert 226.

As can be seen in FIG. 9, when the cutting insert 226 is retained in the insert pocket 218, the cutting insert 226 forces apart the clamping and base jaws 212, 214 and the lower abutment surface 230 abuts the clamping surface 222 of the base jaw 214. On the other hand, the upper abutment surface 228 and the clamping surface 220 of the clamping jaw 212 are in abutment only at their forward regions with a gap 234 formed between their rear regions. The presence of the gap 234 is intentional and is a consequence of manufacturing tolerances. If the insert pocket 218 and the cutting insert 226 had been designed to fit perfectly without the intentional gap 234, then any inaccuracies in the dimensions of the cutting insert 226 could well result in the upper abutment surface 228 and the clamping surface 220 of the clamping jaw 212 being in abutment at their rear regions with a gap formed between their forward regions. Such a situation is, of course, unacceptable.

Clearly, the prior art cutting tools are disadvantageous since only partial abutment between the upper abutment surface 228 and the clamping surface 220 of the clamping jaw 212 results in a situation in which the cutting insert is less rigidly retained in the insert pocket 218 than if these surfaces where in abutment in both their forward and rear regions.

A solution to the above mentioned problem is proposed in U.S. Pat. No. 6,234,727 B1 which describes a cutting tool having a resilient clamping mechanism in which the clamping jaw comprises a first narrow bridge section connecting the clamping jaw to the body portion of the cutting tool and a second narrow bridge section which extends generally towards the second clamping surface. The second narrow bridge section is generally situated between the recess and an aperture and gives rise to a second resilience axis of rotation. The first narrow bridge section is situated generally between the aperture and the upper side of the clamping jaw and gives rise to a first resilience axis of rotation. The clamping jaw has a forward first clamping surface separated by a recess from a rearward second clamping surface.

The first clamping surface can be resiliently displaced about the first resilience axis of rotation, whereas the second clamping surface can independently be resiliently displaced about the second resilience axis of rotation. The first clamping surface exerts a first force on a forward portion of the upper surface of an insert, whilst the second clamping surface exerts a second force on a rearward portion of the upper surface of the insert. If the first narrow bridge section is designed so that the first resilience axis of rotation P lies on the line of action of second force, then the first and second forces are independent of each other. If the first resilience axis of rotation does not lie on the line of action of the second force, then the first and second forces will not be independent of each other. The degree of independence depends on the closeness of the first resilience axis of rotation to the line of action of the second force. The requirement that the first resilience axis of rotation lie on the line of action of second force and the fact that the second resilience axis of rotation is formed by the second narrow bridge section between the recess and the aperture, is a constructional restraint that leaves little room for freedom of design of the clamping jaw and consequently limits the design of the cutting insert.

It is an object of the present invention to provide a cutting tool of the type in which a cutting insert is resiliently clamped in a self-retaining manner, wherein the aforementioned disadvantages are significantly reduced or overcome.

SUMMARY OF THE INVENTION

In accordance with the present invention, there is provided a cutting tool comprising an insert holder and a cutting insert, the insert holder comprising a body portion and a clamping portion, the clamping portion comprising a base jaw, a clamping jaw and an insert pocket therebetween, the insert pocket extending from a pocket opening at a forward end of the pocket to a rear end thereof, the clamping jaw comprising two elongated sub-clamping jaws separated by an elongated forward recess, wherein the cutting insert is resiliently clamped in the insert pocket between the two elongated sub-clamping jaws and the base jaw and wherein the two elongated sub-clamping jaws are independently resilient.

Generally, the elongated forward recess extends from a first opening adjacent the insert pocket in a generally rearward direction and in a direction away from the base jaw to a first termination adjacent the body portion.

Typically, a rear recess extends adjacent the elongated rear sub-clamping jaw in a generally rearward direction from a second opening adjacent the insert pocket to a second termination adjacent the body portion.

Generally, the base jaw has an abutment surface adjacent the insert pocket, the elongated forward sub-clamping jaw has a forward clamping surface adjacent the insert pocket and the elongated rear sub-clamping jaw has a rear clamping surface adjacent the insert pocket, the abutment surface being generally opposite the forward and rear clamping surfaces.

If desired, the abutment surface is provided with a base recess that divides the abutment surface into a forward abutment surface generally opposite the forward clamping surface and a rear abutment surface generally opposite the rear clamping surface.

In accordance with a first embodiment of the present invention, in a side view of the insert holder the forward and rear clamping surfaces lie on a first straight line and the forward and rear abutment surfaces lie on a second straight line, and the first and second straight lines converge to a point rearward of the insert pocket forming a first acute angle therebetween.

In accordance with a second embodiment of the present invention, in a side view of the insert holder, the forward clamping surface lies on a first straight line and the forward and rear abutment surfaces lie on a second straight line, and the first and second straight lines converge to a point rearward of the insert pocket forming a first acute angle therebetween, the rear clamping surface lies on a sixth straight line, the sixth and second straight lines converge to a point rearward of the insert pocket and form between them a fourth acute angle, the first and sixth straight lines are non-collinear and the first straight line passes through the rear sub-clamping jaw.

Typically, the elongated forward sub-clamping jaw has a length that is greater than a terminal width thereof.

Further typically, the elongated forward recess has a length which is greater than the terminal width of the elongated forward sub-clamping jaw.

Yet further typically, the elongated rear sub-clamping jaw has a length that is greater than a terminal width thereof.

In accordance with the first embodiment, the cutting insert comprises, at a forward end thereof, a cutting portion having a cutting edge and, at a rear end thereof, a locating portion, the locating portion comprises an upper locating surface and a lower locating surface, and with the cutting insert retained in the insert pocket the upper locating surface abuts the forward and rear clamping surfaces and the lower locating surface abuts the abutment surface, and in a side view of the cutting insert, the upper and lower locating surfaces lie on third and fourth straight lines that form a second acute angle therebetween, and the third and fourth straight lines converging to a point rearward of the cutting insert.

In accordance with the second embodiment, the cutting insert comprises, at a forward end thereof, a cutting portion having a cutting edge and, at a rear end thereof, a locating portion, the locating portion comprises an upper locating surface and a lower locating surface, the upper locating surface of the cutting insert is divided into three sections, a forward section adjacent the cutting portion, a rear section distal the cutting portion and a middle section located between the forward and rear sections, and with the cutting insert retained in the insert pocket the forward section of the upper locating surface abuts the forward clamping surface, the rear section of the upper locating surface abuts the rear clamping surface, the lower locating surface abuts the abutment surface, and in a side view of the cutting insert, the upper locating surface forward section and the lower locating surface lie on third and fourth straight lines, respectively, that form a second acute angle therebetween, the upper locating surface rear section lies on a fifth straight line that forms a third acute angle with the fourth straight line, and the third and fifth straight lines are non-collinear.

Typically, the forward and middle sections of the upper locating surface form a first obtuse interior angle therebetween and the middle and rear sections of the upper locating surface form a second obtuse exterior angle.

If desired, the insert holder is provided with a protuberance having a rear stop surface adjacent the insert pocket, the protuberance being located between the rear recess and a lower recess, the lower recess extending from the rear of the insert pocket, in a generally rearward direction, the cutting insert is provided with a rear locating surface distal the cutting portion, so that when the cutting insert is retained in the insert pocket the rear locating surface abuts the rear stop surface.

Alternatively if desired, the cutting insert is provided with an upper forward locating surface adjacent the cutting portion, and the insert holder is provided with a forward stop surface adjacent the forward clamping surface, so that when the cutting insert is retained in the insert pocket the upper forward locating surface abuts the forward stop surface.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
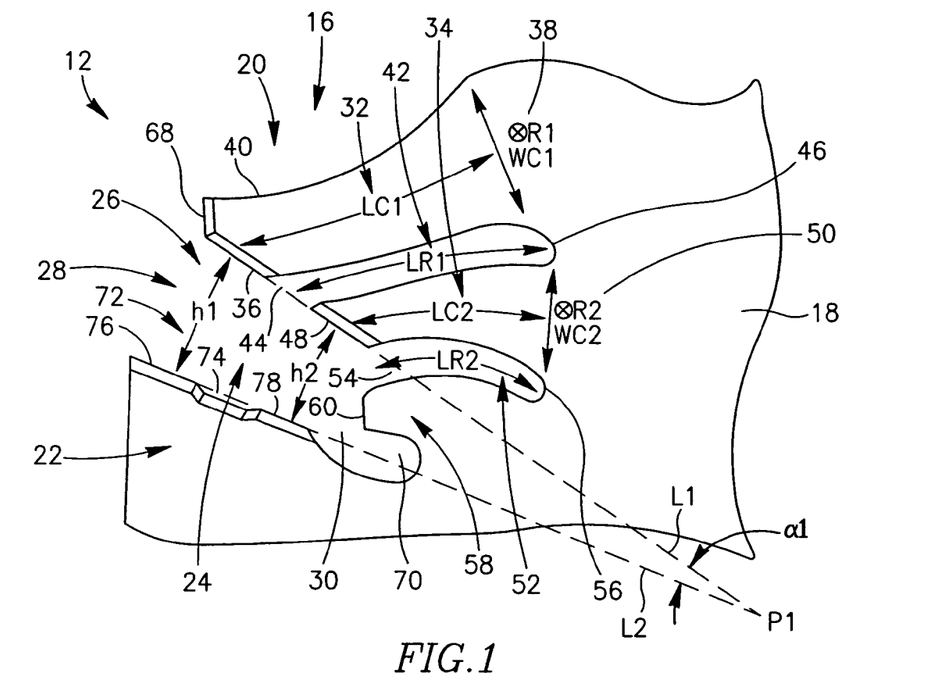
FIG. 1 is a partial side view of a cutting portion of an insert holder of a cutting tool in accordance with a first embodiment of the present invention.
Figure 2:
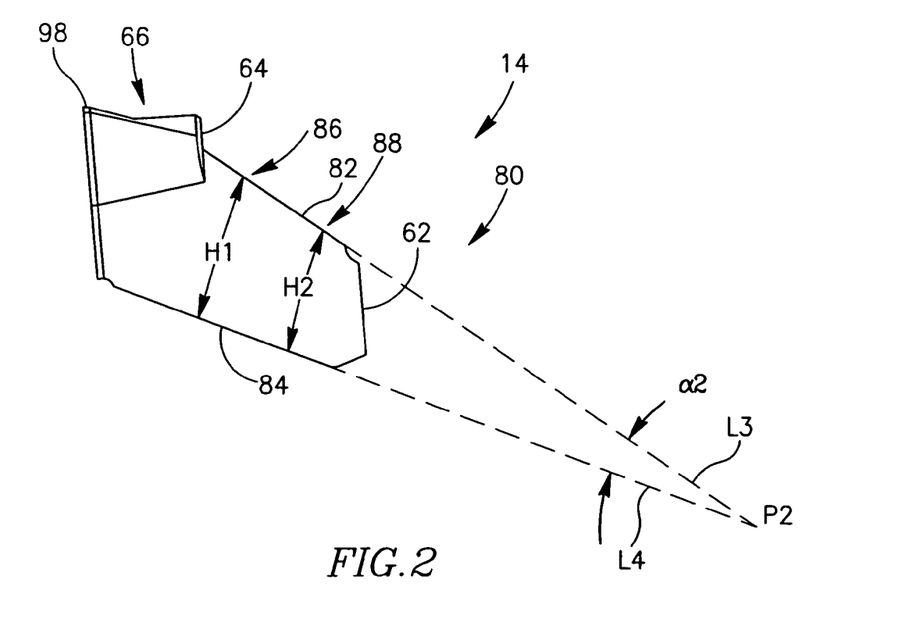
FIG. 2 is a side view of a cutting insert of the cutting tool in accordance with the first embodiment of the present invention.
Figure 3:
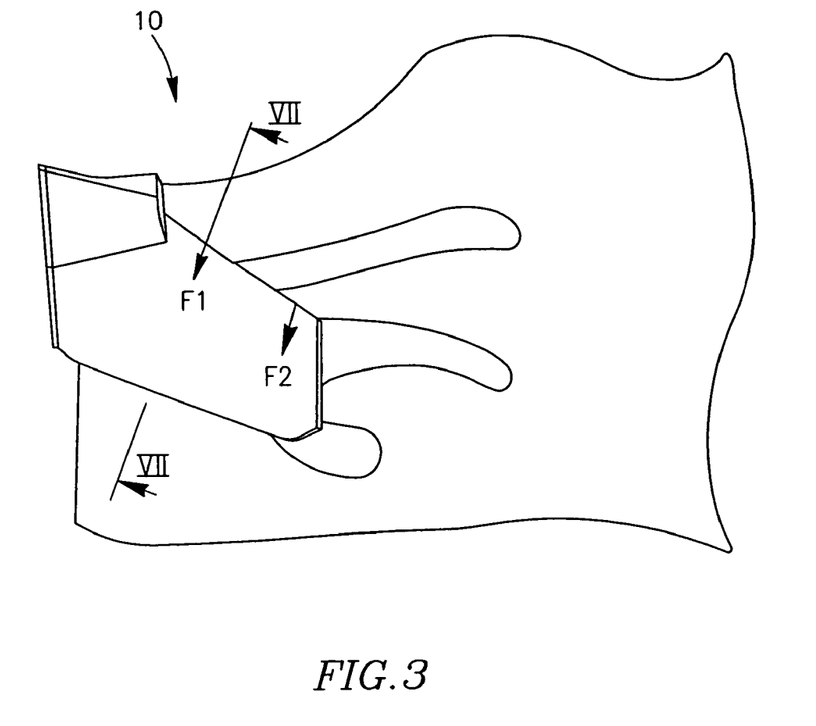
FIG. 3 is a partial side view of the cutting tool in accordance with the first embodiment of the present invention.

Attention is first drawn to FIGS. 1 to 3 showing a cutting tool 10 in accordance with a first embodiment of the present invention. The cutting tool 10 comprises an insert holder 12 and a cutting insert 14. The insert holder 12 has a clamping portion 16 and a body portion 18. The clamping portion 16 comprises an upper clamping jaw 20, a lower base jaw 22 and an insert pocket 24 therebetween. The insert pocket 24 extends from a pocket opening 26 at a forward end 28 of the pocket 24 to a rear end 30 thereof. The clamping jaw 20 comprises two elongated sub-clamping jaws, an elongated forward sub-clamping jaw 32 and an elongated rear sub-clamping jaw 34.

The elongated forward sub-clamping jaw 32 extends from a forward clamping surface 36 adjacent the insert pocket 24 to a terminal end 38. The elongated forward sub-clamping jaw 32 has a length dimension and a width dimension and is bound along its length dimension by a chip surface 40 on one side and an elongated forward recess 42 on the other side. The elongated forward sub-clamping jaw 32 has a length LC1 defined along its length dimension between the forward clamping surface 36 and its terminal end 38, and a terminal width WC1 defined at its terminal end 38 along its width dimension between the chip surface 40 and the elongated forward recess 42. The length LC1 of the elongated forward sub-clamping jaw 32 is greater than its terminal width WC1.

The elongated forward recess 42 has a length LR1 defined between a first opening 44 and a first termination 46. The length LR1 of the elongated forward recess 42 is greater than the terminal width WC1 of the forward sub-clamping jaw 32.

The elongated rear sub-clamping jaw 34 has a rear clamping surface 48 adjacent the insert pocket 24 and is separated from the elongated forward sub-clamping jaw 32 by the elongated forward recess 42. The elongated forward recess 42 extends from the insert pocket 24 in a generally rearward direction and in a direction away from the base jaw 22 towards the body-portion 18, extending from the first opening 44 adjacent the insert pocket 24 to the first termination 46 adjacent the body portion 18.

The elongated rear sub-clamping jaw 34 has a length dimension and a width dimension and extends from the rear clamping surface 48 adjacent the insert pocket 24 to a terminal end 50. The elongated rear sub-clamping jaw 34 has a length LC2 defined along its length dimension between the rear clamping surface 48 and its terminal end 50, and a terminal width WC2 defined at its terminal end 50 along its width dimension. The length LC2 of the elongated rear sub-clamping jaw 34 is greater than its terminal width WC2.

A rear recess 52 extends adjacent the elongated rear sub-clamping jaw 34 in a generally rearward direction from the insert pocket 24 towards the body portion 18, extending from a second opening 54 adjacent the insert pocket 24 to a second termination 56 adjacent the body portion 18, so that the elongated rear sub-clamping jaw 34 is bound along its length dimension by the elongated forward recess 42 on one side and the rear recess 52 on the other side. In accordance with a preferred embodiment, the rear recess 52 is an elongated recess having a length LR2 defined between the second opening 54 and the second termination 56, the length LR2 being greater than the terminal width WC2 of the rear sub-clamping jaw 34.

The rear recess 52 separates the rear sub-clamping jaw 34 from a protuberance 58. The protuberance 58 has a rear stop surface 60 adjacent the insert pocket 24 which may be used for locating the cutting insert 14 in the insert pocket 24 by urging the cutting insert 14 rearwardly until a rear locating surface 62 of the cutting insert 14 abuts the rear stop surface 60. Alternatively, an upper forward locating surface 64 of the insert 14, adjacent a cutting portion 66 thereof may abut a forward stop 68 of the insert holder 12. The forward stop 68 being located adjacent the forward clamping surface 36.

Each sub-clamping jaw 32, 34 is resilient forming a cantilever having a resilience axis of rotation R1, R2. The two sub-clamping jaws 32, 34 are independently resilient, so that the resilience axes of rotation are separated and independent of each other. The forward sub-clamping jaw 32 has the forward resilience axis of rotation R1, located in the vicinity of the terminal end 38 thereof. Similarly, the rear sub-clamping jaw 34 has the rear resilience axis of rotation R2, located in the vicinity of the terminal end 50 thereof.

A lower recess 70 extends from the rear end 30 of the insert pocket 24, in a generally rearward direction. The lower recess 70 separates the protuberance 58 from the base jaw 22. The base jaw 22 comprises an abutment surface 72 adjacent the insert pocket 24. The abutment surface 72 is generally opposite the forward and rear clamping surfaces 36, 48. The abutment surface 72 is divided by a base recess 74 into a forward-abutment surface 76 generally opposite the forward clamping surface 36 and a rear-abutment surface 78 generally opposite the rear clamping surface 48. In a side view of the insert holder 12, the forward and rear clamping surfaces 36, 48 lie on a first straight line L1 and the forward and rear abutment surfaces 76, 78 lie on a second straight line L2, the first and second straight lines L1, L2 converge to a point P1 rearward of the insert pocket 24 and form a first acute angle α1 therebetween.

The cutting insert 14 comprises, at a forward end thereof, the cutting portion 66 having a cutting edge 98 and, at a rear end thereof, a locating portion 80. The locating portion 80 comprises an upper locating surface 82, a lower locating surface 84 and the rear locating surface 62. In a side view of the cutting insert 14, the upper and lower locating surfaces 82, 84 lie on third and fourth straight lines L3, L4 that form a second acute angle α2 therebetween, the third and fourth straight lines L3, L4 converging to a point P2 rearward of the cutting insert.

Since the forward and rear clamping surfaces 36, 48 and the forward and rear abutment surfaces 76, 78 of the insert holder 12 lie on straight lines that converge to the point P1 rearward of the insert pocket 24, and the upper and lower locating surfaces 82, 84 of the cutting insert 14 lie on straight lines that converge to the point P2 rearward of the cutting insert 14, the cutting insert 14 can be inserted into the insert pocket 24 by simply positioning the rear locating surface 62 adjacent the pocket opening 26 and urging the cutting insert 14 rearwardly into the insert pocket 24.

A distance h1 between the forward clamping surface 36 of the forward sub-clamping jaw 32 and the forward abutment surface 76 of the base jaw 22 without the cutting insert 14 located in the insert pocket 24, is less than A distance H1 between the upper and lower locating surfaces 82, 84 of the cutting insert 14 taken at a forward clamping region 86 of the cutting insert 14, where the forward clamping surface 36 and the forward abutment surface 76 would abut the cutting insert 14 with the insert located in the insert pocket 24. Similarly, a distance h2 between the rear clamping surface 48 of the rear sub-clamping jaw 34 and the rear abutment surface 78 of the base jaw 22 without the cutting insert 14 located in the insert pocket 24, is less than a distance H2 between the upper and lower locating surfaces 82, 84 of the cutting insert 14 taken at a rear clamping region 88 of the cutting insert 14, where the rear clamping surface 48 and the rear abutment surface 78 would abut the cutting insert 14 with the insert located in the insert pocket 24.

When the cutting insert 14 is inserted into the insert pocket 24, the forward sub-clamping jaw 32 is forced away from the base jaw 22 when the forward clamping region 86 is located between the forward clamping surface 36 and the forward abutment surface 76, thereby increasing the distance between the forward clamping surface 36 and the forward abutment surface 76. Similarly, the rear sub-clamping jaw 48 is forced away from the base jaw 22 when the rear clamping region 88 is located between the rear clamping surface 48 and the rear abutment surface 78, thereby increasing the distance between the rear clamping surface 48 and the rear abutment surface 78.

Consequently, the cutting insert 14 is resiliently clamped in the insert pocket 24 with the upper locating surface 82 abutting the forward and rear clamping surfaces 36, 48 and the lower locating surface 84 abutting the abutment surface 72, and the clamping jaw 20 exerts two independent clamping forces on the cutting insert upper locating surface 82. A forward clamping force F1 is exerted by the forward sub-clamping jaw 32 and a rear clamping force F2 is exerted by the rear sub-clamping jaw 34. In contrast to the prior art, the independence of the two clamping forces F1, F2 is not dependent on whether or not the line of action of the second clamping force F2 passes through the forward resilience axis of rotation R1.

In accordance with the first embodiment, in a side view of the cutting insert 14, the upper and lower locating surfaces 82, 84 of the cutting insert 14 lie on the straight lines L3, L4 and in a side view of the insert holder 12, the forward and rear clamping surfaces 36, 48 of the clamping jaw 20 lie on a first line L1. An advantage of the complete independence of the two clamping forces F1, F2 that the two sub-clamping jaws 32, 34 exert on the upper locating surface 82 of the cutting insert 14 is that there is a greater freedom of the location of the clamping surfaces 36, 48.

Figure 4:
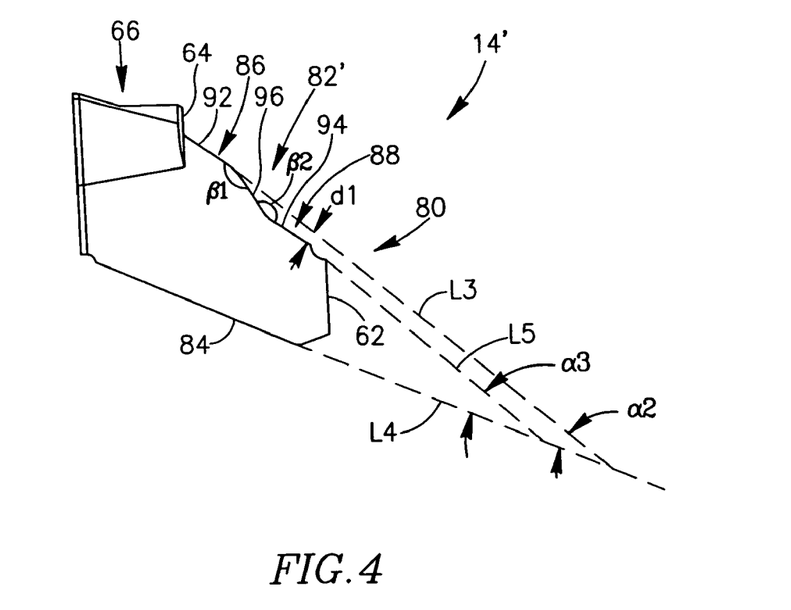
FIG. 4 is a side view of a cutting insert of the cutting tool in accordance with the second embodiment of the present invention.
Figure 5:
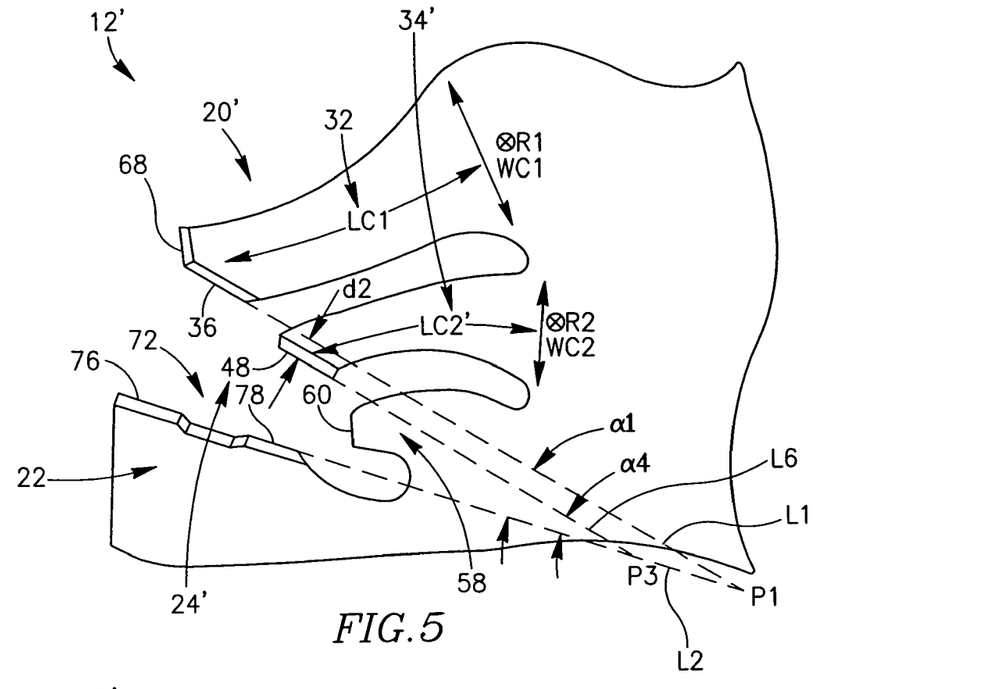
FIG. 5 is a partial side view of a cutting portion of an insert holder of a cutting tool in accordance with a second embodiment of the present invention.
Figure 6:
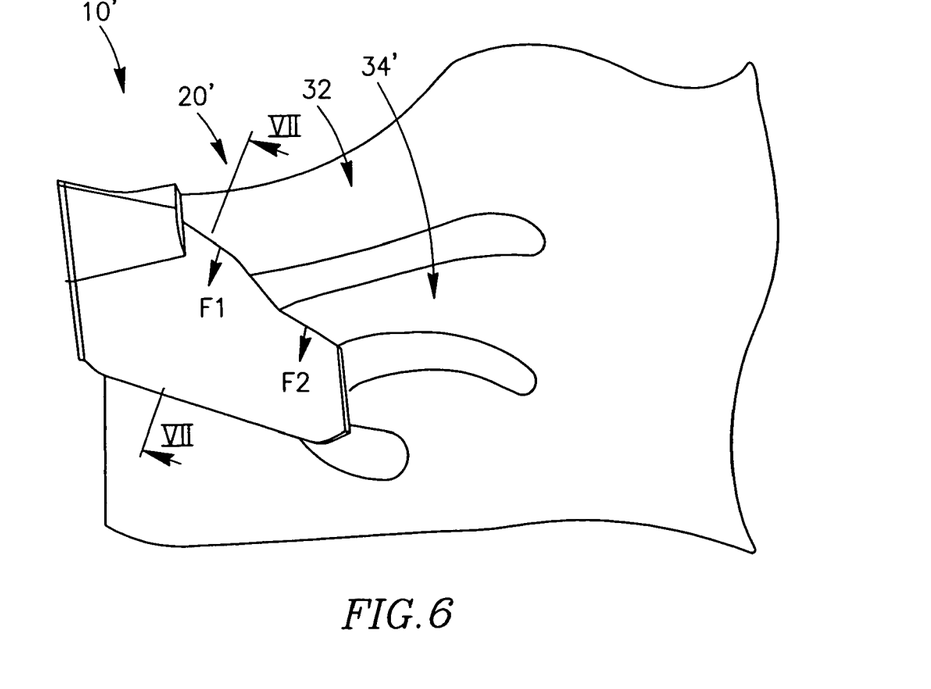
FIG. 6 is a partial side view of the cutting tool in accordance with the second embodiment of the present invention.

Attention is now drawn to FIGS. 4 to 6 showing a cutting tool 10' in accordance with a second embodiment of the present invention. The cutting tool 10' in accordance with the second embodiment is similar to the cutting tool 10 in accordance with the first embodiment apart from two features, namely, the geometry of the upper locating surface 82' of the cutting insert 14' and the length LC2' of the elongated rear sub-clamping jaw 34' which effects the relative location of the forward and rear clamping surfaces 36, 48 of the forward and rear sub-clamping jaws 32, 34, respectively. Reference numerals marked with a "prime" indicate members of the second embodiment of the invention which are similar the members of the first embodiment of the invention with "unprimed" reference numerals but which are modified as a consequence of the differences between the first and second embodiments of the invention.

In accordance with the second embodiment, the upper locating surface 82' of the cutting insert 14' is divided into three sections, a forward section 92 adjacent the cutting portion 66, a rear section 94 distal the cutting portion 66 and a middle section 96 located between the forward and rear sections 92, 94. The forward and middle sections 92, 96 form a first obtuse interior angle β1 therebetween and the middle and rear sections 96, 94 form a second obtuse exterior angle β2 therebetween. The first obtuse interior angle β1 can be less, equal or greater than the second obtuse exterior angle β2.

In a side view of the cutting insert 14', the forward section 92 of the upper locating surface and the lower locating surface 84 lie on the third and fourth straight lines L3, L4, respectively, that form the second acute angle α2 therebetween. The rear section 94 of the upper locating surface lies on a fifth straight line L5 that forms a third acute angle α3 with the fourth straight line L4 on which the lower locating surface 84 lies. The upper locating surface 82' of the cutting insert 14 in accordance with the second embodiment has a stepped formation, with the rear section 94 of the upper locating surface being recessed relative to the forward section 92 of the upper locating surface, so that the third and fifth straight lines L3, L5 are non-collinear. In other words, the third straight line L3, on which the forward section 92 of the upper locating surface lies, is a first given distance d1 from the rear section 94 of the upper locating surface. Since the third and fifth lines L3, L5 are not necessarily parallel, the first given distance d1 may be measured at any convenient point of the rear section 94 of the upper locating surface, for example, at its midpoint.

In a side view of the insert holder 12' in accordance with the second embodiment, the forward clamping surface 36 lies on the first straight line L1 and the forward and rear abutment surfaces 76, 78 lie on the second straight line L2, the first and second straight lines L1, L2 converge to the point P1 rearward of the insert pocket 24 and form between them the first acute angle α1. The rear clamping surface 48 lies on a sixth straight line L6, the sixth and second straight lines L6, L2 converge to a point P3 rearward of the insert pocket 24 and form between them a fourth acute angle α4.

The forward and rear clamping surfaces 36, 48 of the insert holder 12' in accordance with the second embodiment do not lie on the same straight line but have a stepped formation, generally complimentary to the stepped formation of the upper locating surface 82' of the cutting insert 14' in accordance with the second embodiment. In other words, the first and sixth straight lines L1, L6 are non-collinear and the first straight line L1, on which the forward clamping surface 36 lies, passes through the rear sub-clamping jaw 34' at a second given distance d2 from the rear clamping surface 48. If desired, the second given distance d2 may be equal to the first given distance d1. Since the first and sixth straight lines L1, L6 are not necessarily parallel, the second given distance d2 may be measured at any convenient point of the rear clamping surface 48, for example, at its midpoint.

In other words, the insert holder 12' in accordance with the second embodiment is similar to the insert holder 12 in accordance with the first embodiment apart from the length LC2' of the rear sub-clamping jaw 34'. The length LC2' of the rear sub-clamping jaw 34' of the insert holder 12' in accordance with the second embodiment is longer than the length LC2 of the rear sub-clamping jaw 34 of the insert holder 12 in accordance with the first embodiment, all other dimensions being the same. The second given distance d2 is the difference between the length LC2 of the rear sub-clamping jaw 34' of the insert holder 12' in accordance with the second embodiment and the length LC2 of the rear sub-clamping jaw 34 of the insert holder 12 in accordance with the first embodiment.

When the cutting insert 14' in accordance with the second embodiment is inserted into the insert pocket 24' of the insert holder 12' in accordance with the second embodiment and urged rearwardly, the forward sub-clamping jaw 32 is forced away from the base jaw 22 when the forward clamping region 86 is located between the forward clamping surface 36 and the forward abutment surface 76, thereby increasing the distance between the forward clamping surface 36 and the forward abutment surface 76. Similarly, the rear sub-clamping jaw 34' is forced away from the base jaw 22 when the rear clamping region 88 is located between the rear clamping surface 48 and the rear abutment surface 78, thereby increasing the distance between the rear clamping surface 48 and the rear abutment surface 78.

Consequently, when the cutting insert 14' reaches its final position and is precisely located in the insert pocket 24' it is resiliently clamped in the insert pocket 24' with the forward section 92 of the upper locating surface abutting the forward clamping surface 36, the rear section 94 of the upper locating surface abutting the rear clamping surface 48, the lower locating surface 84 abutting the abutment surface 72 and the clamping jaw 20 exerts two independent clamping forces F1', F2' on the cutting insert's upper locating surface 82'. A forward clamping force F1' is exerted by the forward sub-clamping jaw 32 and a rear clamping force F2' is exerted by the rear sub-clamping jaw 34'.

In the second embodiment of the present invention, as with in the first embodiment, in order to precisely locate the cutting insert 14' in the insert pocket 24', the insert holder 12' may be provided with a protuberance 58 having a rear stop surface 60 adjacent the insert pocket 24' which may be used for locating the cutting insert 14' in the insert pocket 24' by urging the cutting insert 14' rearwardly until the rear locating surface 62 of the cutting insert 14' abuts the rear stop surface 60. Alternatively, an upper forward locating surface 64 of the cutting insert 14', adjacent the cutting portion 66, may abut a forward stop 68 of the insert holder 12'. The forward stop 68 being located adjacent the forward clamping surface 36.

Figure 7A:
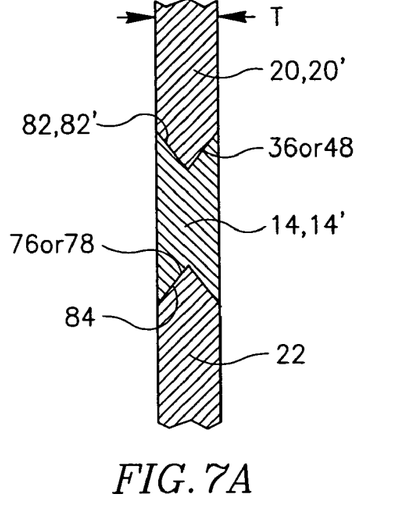
FIG. 7A is a partial cross sectional view taken along the line VII-VII in FIGS. 3 and 6 passing through the forward clamping surface and forward section of the upper locating surface, showing the mechanism for preventing lateral movement of an insert having concave V-shaped cross-sectional surfaces.
Figure 7B:
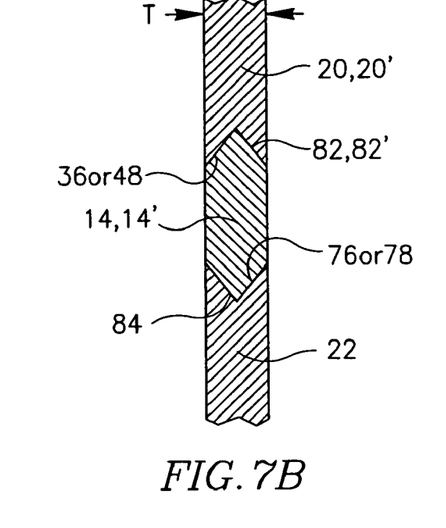
FIG. 7B is similar to FIG. 7A but for an insert having convex V-shaped cross-sectional surfaces.

As is well known in the art (see, for example, U.S. Pat. Nos. 4,580,930 and 4,887,945) lateral stability of the cutting insert 14, 14' (for preventing lateral movement of the cutting insert 14, 14' with respect to the cutting tool 10, 10') can be achieved by forming the clamping surfaces 36, 48 of the clamping jaw 20, 20', and the abutment surfaces 76, 78 of the base jaw 22, with cross sectional shapes that mate the corresponding abutted locating surfaces 82, 82', 84 of the cutting insert 14, 14'. If desired, as shown in FIG. 7A, the clamping surfaces 36, 48 of the clamping jaw 20, 20', and the abutment surfaces 76, 78 of the base jaw 22 may have convex V-shaped cross-sections, and the upper and lower locating surfaces 82, 82', 84 of the cutting insert 14, 14' may have mating concave V-shaped cross-sectional surfaces. Alternatively, as shown in FIG. 7B, the clamping surfaces 36, 48 of the clamping jaw 20, 20', and the abutment surfaces 76, 78 of the base jaw 22 may have concave V-shaped cross-sections, and the upper and lower locating surfaces 82, 82', 84 of the cutting insert 14, 14' may have mating convex V-shaped cross-sectional surfaces. Also seen in FIGS. 7A and 7B is the thickness dimension T of the insert holder 12, 12' which typically is in the range of 0.5 mm to 12 mm.

What is claimed is:

1. A cutting tool comprising an insert holder and a cutting insert, the insert holder comprising a body portion and a clamping portion, the clamping portion comprising a base jaw, a clamping jaw and an insert pocket therebetween, the insert pocket extending from a pocket opening at a forward end of the pocket to a rear end thereof, the clamping jaw comprising elongated forward and rear sub-clamping jaws separated by an elongated forward recess, the elongated forward sub-clamping jaw having a forward clamping surface adjacent the insert pocket and the elongated rear sub-clamping jaw having a rear clamping surface adjacent the insert pocket, the base jaw having an abutment surface adjacent the insert pocket, the abutment surface being generally opposite the forward and rear clamping surfaces, wherein:

the cutting insert is resiliently clamped in the insert pocket between the two elongated sub-clamping jaws and the base jaw;

the two elongated sub-clamping jaws are independently resilient;

the forward clamping surface lies on a first straight line;

the abutment surface lies on a second straight line; and the first and second straight lines converge to a point rearward of the insert pocket forming a first acute angle therebetween.

2. An insert holder comprising a body portion and a clamping portion, the clamping portion comprising a base jaw, a clamping jaw and an insert pocket therebetween, the insert pocket extending from a pocket opening at a forward end of the pocket to a rear end thereof, the clamping jaw comprising elongated forward and rear sub-clamping jaws separated by an elongated forward recess, the elongated forward sub-clamping jaw having a forward clamping surface adjacent the insert pocket and the elongated rear sub-clamping jaw having a rear clamping surface adjacent the insert pocket, the base jaw having an abutment surface adjacent the insert pocket, the abutment surface being generally opposite the forward and rear clamping surfaces, wherein:

the two elongated sub-clamping jaws are independently resilient;

the forward clamping surface lies on a first straight line;

the abutment surface lies on a second straight line; and the first and second straight lines converge to a point rearward of the insert pocket forming a first acute angle therebetween.

3. A cutting tool comprising an insert holder and a cutting insert, the insert holder comprising a body portion and a clamping portion, the clamping portion comprising a base jaw, a clamping jaw and an insert pocket therebetween, the insert pocket extending from a pocket opening at a forward end of the pocket to a rear end thereof, the clamping jaw comprising elongated forward and rear sub-clamping jaws separated by an elongated forward recess, wherein:

the cutting insert is resiliently clamped in the insert pocket between the two elongated sub-clamping jaws and the base jaw;

the two elongated sub-clamping jaws are independently resilient;

the elongated forward sub-clamping jaw has a length that is greater than a terminal width thereof; and the elongated rear sub-clamping jaw has a length that is greater than a terminal width thereof.

4. The cutting tool according to claim 3, wherein the elongated forward recess has a length which is greater than the terminal width of the elongated forward sub-clamping jaw.

5. The cutting tool according to claim 3, wherein the elongated forward recess extends from a first opening adjacent the insert pocket in a generally rearward direction and in a direction away from the base jaw to a first termination adjacent the body portion.

6. The cutting tool according to claim 3, wherein a rear recess extends adjacent the elongated rear sub-clamping jaw in a generally rearward direction from a second opening adjacent the insert pocket to a second termination adjacent the body portion.

7. The cutting tool according to claim 3, wherein the base jaw has an abutment surface adjacent the insert pocket, the elongated forward sub-clamping jaw has a forward clamping surface adjacent the insert pocket and the elongated rear sub-clamping jaw has a rear clamping surface adjacent the insert pocket, the abutment surface being generally opposite the forward and rear clamping surfaces.

8. The cutting tool according to claim 7, wherein the abutment surface is provided with a base recess that divides the abutment surface into a forward abutment surface generally opposite the forward clamping surface and a rear abutment surface generally opposite the rear clamping surface.

9. The cutting tool according to claim 8, wherein:

the cutting insert comprises:

at a forward end thereof, a cutting portion having a cutting edge; and at a rear end thereof, a locating portion comprising an upper locating surface and a lower locating surface;

the upper locating surface abuts the forward and rear clamping surfaces; and the lower locating surface abuts the abutment surface.

10. The cutting tool according to claim 9, wherein in a side view of the insert holder:

the forward and rear clamping surfaces lie on a first straight line;

the forward and rear abutment surfaces lie on a second straight line; and the first and second straight lines converge to a point rearward of the insert pocket forming a first acute angle therebetween.

11. The cutting tool according to claim 10, wherein:
in a side view of the cutting insert, the upper and lower locating surfaces lie on third and fourth straight lines that form a second acute angle therebetween, the third and fourth straight lines converging to a point rearward of the cutting insert.

12. The cutting tool according to claim 9, wherein in a side view of the insert holder:
the forward clamping surface lies on a first straight line;
the forward and rear abutment surfaces lie on a second straight line;
the first and second straight lines converge to a point rearward of the insert pocket forming a first acute angle therebetween;
the rear clamping surface lies on a sixth straight line;
the sixth and second straight lines converge to a point rearward of the insert pocket and form between them a fourth acute angle;
the first and sixth straight lines are non-collinear; and
the first straight line passes through the rear sub-clamping jaw.

13. The cutting tool according to claim 12, wherein:
the upper locating surface of the cutting insert comprises a forward section adjacent the cutting portion, a rear section distal the cutting portion and a middle section located between the forward and rear sections;
the forward section of the upper locating surface abuts the forward clamping surface;
the rear section of the upper locating surface abuts the rear clamping surface; and
in a side view of the cutting insert:
the upper locating surface forward section and the lower locating surface lie on third and fourth straight lines, respectively, that form a second acute angle therebetween;
the upper locating surface rear section lies on a fifth straight line that forms a third acute angle with the fourth straight line; and
the third and fifth straight lines are non-collinear.

14. The cutting tool according to claim 13, wherein:
the forward and middle sections of the upper locating surface form a first obtuse interior angle therebetween; and
the middle and rear sections of the upper locating surface form a second obtuse exterior angle.

15. The cutting tool according to claim 9, wherein:
the insert holder is provided with a protuberance having a rear stop surface adjacent the insert pocket, the protuberance being located between the rear recess and a lower recess, the lower recess extending from the rear of the insert pocket, in a generally rearward direction; and
the cutting insert is provided with a rear locating surface distal the cutting portion, said rear locating surface abutting the rear stop surface.

16. The cutting tool according to claim 9, wherein:
the insert holder is provided with a forward stop surface adjacent the forward clamping surface; and
the cutting insert is provided with an upper forward locating surface adjacent the cutting portion, said upper forward locating surface abutting the forward stop surface.

17. The cutting tool according to claim 6, wherein the rear recess is elongated, having a length which is greater than the terminal width of the elongated rear sub-clamping jaw.

18. An insert holder comprising a body portion and a clamping portion,
the clamping portion comprising a base jaw, a clamping jaw and an insert pocket therebetween, the insert pocket extending from a pocket opening at a forward end of the pocket to a rear end thereof,
the clamping jaw comprising elongated forward and rear sub-clamping jaws separated by an elongated forward recess, wherein:
the two elongated sub-clamping jaws are independently resilient;
the elongated forward sub-clamping jaw has a length that is greater than a terminal width thereof; and
the elongated rear sub-clamping jaw has a length that is greater than a terminal width thereof.

19. The insert holder according to claim 18, wherein the elongated forward recess has a length which is greater than the terminal width of the elongated forward sub-clamping jaw.

20. The insert holder according to claim 18, wherein the elongated forward recess extends from a first opening adjacent the insert pocket in a generally rearward direction and in a direction away from the base jaw to a first termination adjacent the body portion.

21. The insert holder according to claim 18, wherein a rear recess extends adjacent the elongated rear sub-clamping jaw in a generally rearward direction from a second opening adjacent the insert pocket to a second termination adjacent the body portion.

22. The insert holder according to claim 18, wherein the base jaw has an abutment surface adjacent the insert pocket, the elongated forward sub-clamping jaw has a forward clamping surface adjacent the insert pocket and the elongated rear sub-clamping jaw has a rear clamping surface adjacent the insert pocket, the abutment surface being generally opposite the forward and rear clamping surfaces.

23. The insert holder according to claim 22, wherein the abutment surface is provided with a base recess dividing the abutment surface into a forward abutment surface generally opposite the forward clamping surface and a rear abutment surface generally opposite the rear clamping surface.

24. The insert holder according to claim 23, wherein in a side view of the insert holder:
the forward and rear clamping surfaces lie on a first straight line;
the forward and rear abutment surfaces lie on a second straight line; and
the first and second straight lines converge to a point rearward of the insert pocket forming a first acute angle therebetween.

25. The insert holder according to claim 23, wherein in a side view of the insert holder:
the forward clamping surface lies on a first straight line;
the forward and rear abutment surfaces lie on a second straight line;
the first and second straight lines converge to point rearward of the insert pocket forming a first acute angle therebetween;
the rear clamping surface lies on a sixth straight line;
the sixth and second straight lines converge to a point rearward of the insert pocket and form between them a fourth acute angle;
the first and sixth straight lines are non-collinear; and
the first straight line passes through the rear sub-clamping jaw.

26. The insert holder according to claim 21, wherein the rear recess is elongated, having a length which is greater than the terminal width of the elongated rear sub-clamping jaw.

27. A cutting insert comprising, at a forward end thereof, a cutting portion having a cutting edge and, at a rear end thereof, a locating portion, the locating portion comprising an upper locating surface and a lower locating surface, the upper locating surface being divided into three sections, a forward section adjacent the cutting portion, a rear section distal the cutting portion and a middle section located between the forward and rear sections,     wherein in a side view of the cutting insert:

the upper locating surface forward section lies on a third straight line,     the lower locating surface lies on a fourth straight line,     the upper locating surface rear section lies on a fifth straight line,     the third and fourth straight lines converge in a rearward direction of the cutting insert to form a second acute angle, and     the third and fifth straight lines are non-collinear.

28. The cutting insert according to claim 27, wherein the forward and middle sections of the upper locating surface form a first obtuse interior angle therebetween and the middle and rear sections of the upper locating surface form a second obtuse exterior angle.

29. The cutting insert according to claim 27, wherein:

the fourth and fifth straight lines converge in a rearward direction of the cutting insert to form a third acute angle.

* * * * *